(12) United States Patent
Fandrey et al.

(10) Patent No.: US 6,546,805 B2
(45) Date of Patent: Apr. 15, 2003

(54) PROCESS FLUID TRANSMITTER WITH AN ENVIRONMENTALLY SEALED SERVICE BLOCK

(75) Inventors: Mark C. Fandrey, Eden Prairie, MN (US); George C. Hausler, Maple Grove, MN (US); Robert LaRoche, Eden Prairie, MN (US)

(73) Assignee: Rosemount Inc., Eden Priarie, MN (US)

( * ) Notice: Subject to any disclaimer, the term of this patent is extended or adjusted under 35 U.S.C. 154(b) by 0 days.

(21) Appl. No.: 09/867,961

(22) Filed: May 30, 2001

(65) Prior Publication Data

US 2002/0007681 A1 Jan. 24, 2002

Related U.S. Application Data

(63) Continuation-in-part of application No. 09/519,912, filed on Mar. 7, 2000.

(51) Int. Cl.[7] .................................................. G01L 9/00
(52) U.S. Cl. ........................ 73/753; 73/706; 73/861.42
(58) Field of Search .......................... 73/708, 729, 706, 73/753, 756, 728, 861.42, 861.02, 861.04; 361/816; 340/626

(56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |

(List continued on next page.)

FOREIGN PATENT DOCUMENTS

| | | |
|---|---|---|
| DE | 37 41 648 A1 | 7/1988 |
| DE | G 91 09 176.4 | 10/1991 |
| DE | 197 45 244 A1 | 4/1998 |
| DE | 299 03 260 U1 | 5/2000 |
| EP | 0 063 685 A1 | 11/1982 |
| EP | 0 214 801 A1 | 3/1987 |
| EP | 0 223 300 A2 | 5/1987 |
| EP | 0 268 742 A1 | 6/1988 |
| EP | 0 639 039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

Product Data Sheet No: 00813–0100–4378, "Model 751 Field Signal Indicator", by Rosemount Inc., Eden Prairie, Minnesota, (1997).

(List continued on next page.)

*Primary Examiner*—Hezron Williams
*Assistant Examiner*—Alandra Ellington
(74) *Attorney, Agent, or Firm*—Westman, Champlin & Kelly, P.A.

(57) ABSTRACT

An environmentally sealed service block is mounted inside a field wiring compartment of a process fluid transmitter. The service block has field wiring terminals, sealed jumper assemblies and sealed pushbutton switches connected to a sealed cable and plug. The sealed plug plugs into a permanently sealed transmitter assembly. High impedance programming circuitry connected to the jumper assemblies and pushbutton switches is completely sealed and not subject to malfunction due to contamination present in the field wiring compartment.

13 Claims, 10 Drawing Sheets

U.S. PATENT DOCUMENTS

| | | | |
|---|---|---|---|
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A * | 11/1990 | Walish et al. | 73/706 |
| 4,980,675 A * | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 264/463 |
| 5,227,782 A | 7/1993 | Nelson | 340/870.21 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A * | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 364/557 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.2 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,988,203 A | 11/1999 | Hutton | 137/597 |
| 6,005,500 A | 12/1999 | Goboury et al. | 341/43 |
| 6,006,338 A | 12/1999 | Longsdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,216,172 B1 | 4/2001 | Kolblin et al. | 709/253 |
| 6,233,532 B1 | 5/2001 | Boureau et al. | 702/89 |
| 6,285,964 B1 | 9/2001 | Babel et al. | 702/121 |
| 6,295,875 B1 | 10/2001 | Frick et al. | 73/718 |
| 6,311,568 B1 | 11/2001 | Kleven | 73/861.42 |
| 6,321,166 B1 | 11/2001 | Evans et al. | 702/50 |
| 6,415,188 B1 | 7/2002 | Fernandez et al. | 700/67 |
| 6,421,570 B1 | 7/2002 | McLaughlin et al. | 700/2 |

OTHER PUBLICATIONS

Product Data Sheet No: 00813–0100–4731, "APEX™ Radar Gauge", by Rosemount Inc., Eden Prairie, Minnesota, (1998).

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No: 00813–0100–4003, "Model 8800A", by Rosemount Inc., Eden Prairie, Minnesota, (1998).

Product Data Sheet No: 00813–0100–4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No.: 00813–0100–4263, "Model 444 Alphaline® Temperature Transmitters", by Rosemount Inc., Eden Prairie, Minnesota, (1997).

Product Data Sheet No: 00813–0100–4769, "Model 3244MV Multivariable Temperature Transmitter with Foundation™ Fieldbus", by Rosemount Inc., Eden Prairie, Minnesota, (1998).
Product Data Sheet No: 00813–0100–4724, "Models 3144 and 3244MV Smart Temperature Transmitters", by Rosemount Inc., Eden Prairie, Minnesota, (1998).
Product Data Sheet No: 00813–0100–4738, "Model 3095FB Multivariable™ Transmitter with Modbus™ Protocol", by Rosemount Inc., Eden Prairie, Minnesota, (1996, 1997).
Product Data Sheet No: 00813–0100–4001, "Model 3051 Digital Pressure Transmitter for Pressure, Flow, and Level Measurement", by Rosemount Inc., Eden Prairie, Minnesota, (1998).
Product Data Sheet No: 00813–0100–4698, "Model 2090F Sanitary Pressure Transmitter", by Rosemount Inc., Eden Prairie, Minnesota, (1998).
Product Data Sheet No: 00813–0100–4690, "Model 2088 Economical Smart Pressure Transmitter", by Rosemount Inc., Eden Prairie, Minnesota, (1998).
Product Data Sheet No: 00813–0100–4592, "Model 2024 Differential Pressure Transmitter", by Rosemount Inc., Eden Prairie, Minnesota, (1987–1995).
Product Data Sheet No: 00813–0100–4360, "Model 1151 Alphaline® Pressure Transmitters", by Rosemount Inc., Eden Prairie, Minnesota, (1998).
Product Data Sheet No: 00813–0100–4458, "Model 1135F Pressure–to–Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.
Technical Information Bulletin, "Liquid Level Transmitter Model DB40RL Sanitary Sensor deltapilot," Endress+ Hauser, Greenwood, Indiana, 9/92, pp. 1–8.
"The Digitisation of Field Instruments" W. Van Der Bijl, *Journal A*, vol. 32, No. 3, 1991, pp. 62–65.
Specification Summary, "Teletrans™ 3508–30A Smart Differential Pressure Transmitter," (undated) Bristol Babcock, Inc., Watertown, CT, 06795.
Specification Summary, "Teletrans™ 3508–10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.
"Flow Measurement," *Handbook of Fluid Dynamics*, V. Streeter, Editor–in–chief, published by McGraw–Hill Book Company, Inc. 1961, pp. 14–4 to 14–15.
"Precise Computerized In–Line Compressible Flow Metering," *Flow—Its Measurement and Control in Science and Industry*, vol. 1, Part 2, Edited by R. Wendt, Jr., Published by American Institute of Physics et al, (undated) pp. 539–540.

"A Systems Approach," Dr. C. Ikoku, *Natural Gas Engineering*, PennWell Books, (undated) pp. 256–257.
"Methods for Volume Measurement Using Tank–Gauging Devices Can Be Error Prone," F. Berto, *The Advantages of Hydrostatic Tank Gauging Systems*, undated reprint from *Oil & Gas Journal*.
"Hydrostatic Tank Gauging—Technology Whose Time Has Come," J. Berto, *Rosemount Measurement Division Product Feature*, undated reprint from *Intech*.
"Pressure Sensors Gauge Tank Level and Fluid Density," *Rosemount Measurement Division Product Feature*, undated reprint from *Prepared Foods* (Copyrighted 1991 by Gorman Publishing Company).
"Low Cost Electronic Flow Measurement System," *Tech Profile*, May 1993, Gas Research Institute, Chicago, IL.
"Development of an Integrated EFM Device for Orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, *Control Engineering*, Dec. 1992, Bristol Babcock, Inc., Watertown, CT 06795.
"Smart Transmitters Tear Up The Market," C. Polsonetti, *Intech*, Jul. 1993, pp. 42–45.
"MicroLAN Design Guide", Dallas Semiconductor, Tech Brief No. 1, (undated).
"Bosch CAN Specification Version 2.0", by Robert Bosch GmbH, pp. 1–68 including pp. –1–and –2–, (Sep. 1991).
Product Data Sheet No. 00813–0100–4001, "Digital Pressure Transmitter for Pressure, Flow, and Level Measurement", by Rosemount Inc., (1998).
"Claudius Ptolemy (100?–170? AD)", *M&C News*, 7 pages, (Apr. 1994).
American National Standard, "Hydraulic Fluid Power–Solenoid Piloted Industrial Valves–Interface Dimensions for Electrical Connectors", National Fluid Power Association, Inc., 10 pages, (Aug. 1981).
2 pages downloaded from http://www.interlinkbt.com/Product/IBT_Prod/DN/CN–DM_PN/EURO–DP.HTM dated Sep. 15, 2000.
4 pages downloaded from http://www.interlinkbt.com/Product/IBT_Prod/dn/EUR–CON/euro–fwc.htm dated Sep. 15, 2000.
3 pages from Turk Cable Standards, by Turk, Inc., Minneapolis, Minnesota.
"Notification of Transmittal of the International Search Report or Declaration" for International application Serial No. PCT/US00/26561.
"Notification of Transmittal of the International Search Report or Declaration" for International application Serial No. PCT/US00/26488.
"Notification of Transmittal of the International Search Report or Declaration" for International application Serial No. PCT/US00/26563.
"Notification of Transmittal of the International Search Report or the Declaration" PCT/US01/13993.

* cited by examiner

PROCESS FLUID TRANSMITTER WITH AN ENVIRONMENTALLY SEALED SERVICE BLOCK

CROSS-REFERENCE TO RELATED APPLICATION

This application is a continuation-in-part of U.S. application Ser. No. 09/519,912, filed Mar. 7, 2000, titled "PRE-INSTALLATION OF A PRESSURE SENSOR MODULE".

FIELD OF THE INVENTION

This invention relates to transmitters used in industrial fluid processing plants. In particular, this invention relates to an improved arrangement for field programming switches in process fluid transmitters.

BACKGROUND OF THE INVENTION

Modern industrial process fluid transmitters often have embedded microprocessors and are field programmable to adjust span, zero, alarm, security or other settings.

In some installations, these setting are programmed by temporarily connecting a handheld serial communication device to the transmitter's two-wire field circuit. It can be complex and time consuming, however, to find and connect the device and enter programming commands via a keyboard on the device.

In other installations, there are programming switches that are easier to program inside the transmitter circuit board housing. This arrangement, however, has certain disadvantages. In order to use these programming switches in the field, the circuit board housing is opened up in the process plant atmosphere. This exposes sensitive transmitter circuitry to atmospheric humidity, moisture or chemicals.

In some transmitters, the problem is addressed by using magnetically actuated reed switches so that the transmitter circuit board housing does not need to be opened. The arrangement with reed switches, however, is expensive to implement and only a small number of switches can be used because of size limitations.

Programming switch circuitry is energized, along with the rest of the transmitter circuitry, by the two-wire field circuit that provides a 4–20 mA current with a voltage range of 10.5–55 volts. The transmitter must be designed to be fully operational on 4 mA and 10.5 volts, or only about 42 milliwatts. This means that any bias or "pull-up" resistors for the switch circuitry must be high impedance to limit power consumption. With such high impedance circuits, even small amounts of chemicals, water, or humidity can cause electrical leakage in the switch circuitry. This leakage can cause a false indication to transmitter circuitry that a switch has been actuated.

There is a desire to have a transmitter that has sensor circuit boards in a permanently sealed housing and also multiple programming switches placed outside the permanently sealed circuit board housing. There is also a desire to avoid false indication from programming switch circuits due to contamination, water or humidity in the environment.

SUMMARY OF THE INVENTION

An environmentally sealed service block is mounted on mounting ears inside a field wiring compartment of a process fluid transmitter. The service block includes sealed programming jumper assemblies and sealed programming pushbutton switches. The service block also includes a sealed cable that connects to the pushbutton switches, the jumper assemblies and field wiring terminals. The sealed cable has a plug that plugs into a transmitter electrical connector of a permanently sealed transmitter assembly.

Circuitry connected to the jumper assemblies and pushbutton switches is effectively sealed and not subject to malfunction due to contamination present in the field wiring compartment. The transmitter assembly remains permanently sealed when the programming jumper assemblies or pushbutton switches are actuated.

DETAILED DESCRIPTION OF THE PREFERRED EMBODIMENTS

With the present invention, an environmentally sealed service block is mounted inside a field wiring compartment on mounting ears. The service block includes sealed jumper assemblies and sealed pushbutton switches that provide programming. The service block includes a sealed cable that connects to the sealed pushbutton switches and jumper assemblies and a plug that plugs into a permanently sealed transmitter assembly. High impedance programming circuitry connected to the jumper assemblies and pushbutton switches is effectively sealed and not subject to malfunction due to contamination present in the field wiring compartment. The transmitter can be reliably programmed using the jumper assemblies and the pushbutton switches, which are not affected by contamination, or even flooding of the field wiring compartment.

A field wiring compartment is a very harsh environment for programming switches and their associated high impedance circuits. Field wiring compartments are usually connected to electrical conduits and are subject to occasional flooding from condensate that runs in from the conduits. Field wiring compartments are also subject to contamination by the surrounding chemical atmosphere in the fluid processing plants. Field wiring compartments are opened for installation and service operations, and technicians typically expose circuit boards to contaminants that are capable of causing undesirable electrical leakage in high impedance circuits.

With the present invention, the expense and installation complexity of adding cable glands or sealing junction boxes to wiring conduits can be avoided because the field wiring compartment does not need to be sealed from the field wiring conduits.

The service block also includes terminals that are adapted for connection to the field wiring, or 4–20 mA circuit.

Figure 1:
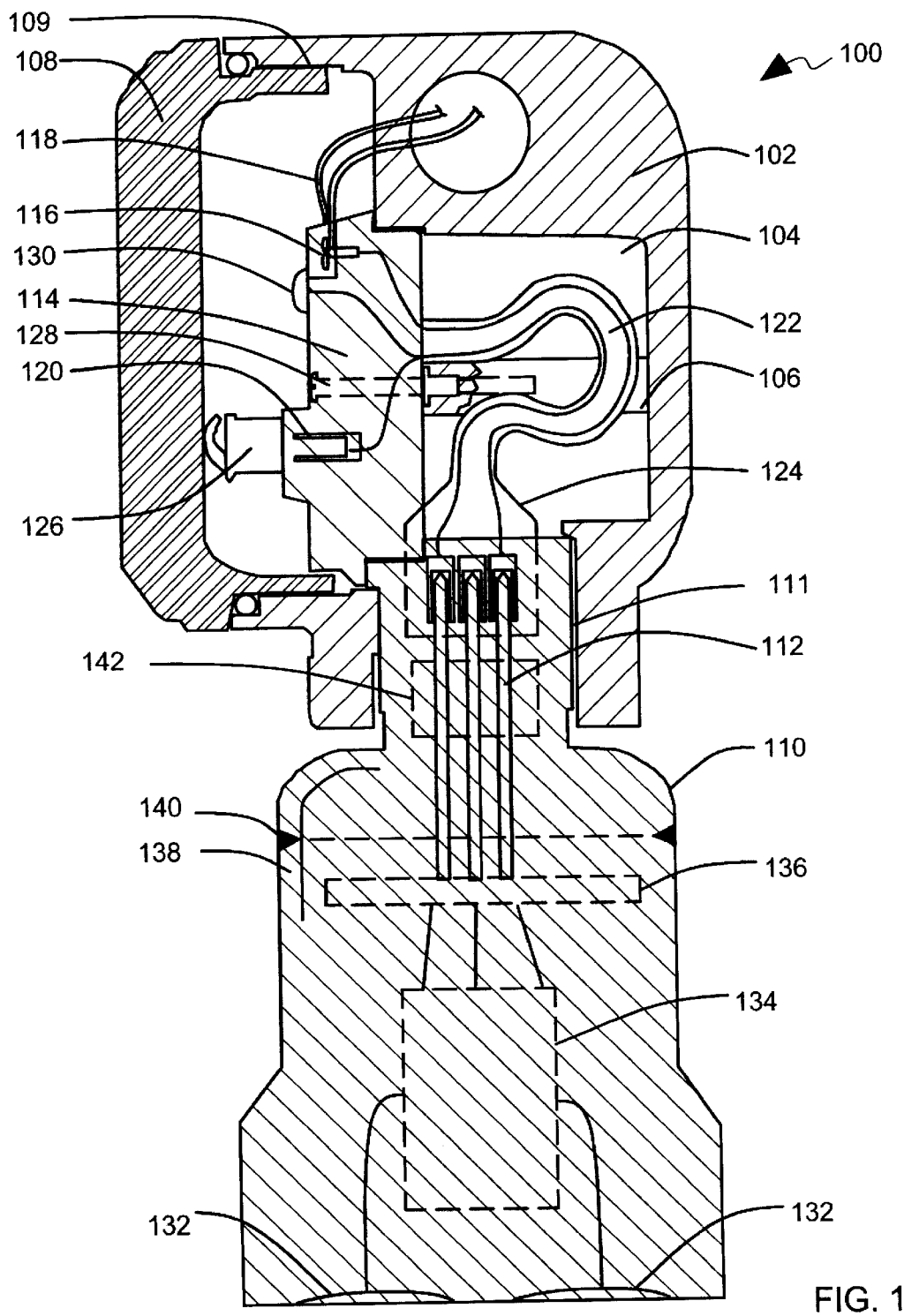
FIG. 1 illustrates a process fluid transmitter.

FIG. 1 illustrates a process fluid transmitter 100.

Transmitter 100 includes a field wiring housing 102 that surrounds a wiring compartment 104. The wiring housing 102 can be formed of a metal such as aluminum or stainless steel. Mounting members, such as ears 106, are formed inside the wiring compartment 104, and a compartment cover 108 is threaded and engages corresponding threads inside the wiring compartment as illustrated at 109. The wiring housing 102 is explained in more detail below in connection with FIGS. 2–3.

A permanently sealed transmitter assembly 110 is threaded and engages corresponding threads inside the wiring compartment as illustrated at 111. As illustrated, transmitter assembly 110 is a differential pressure transmitter assembly and includes sealed isolator diaphragms 132, a pressure sensor 134 and one or more printed circuit boards 136. The transmitter assembly 110 has a transmitter electrical connector 112 that is accessible inside the wiring compartment 104. Transmitter assembly 110 has an outer metal housing 138 that is permanently welded shut at weld 140 and a hermetically sealed feedthrough 142 surrounding the transmitter electrical connector 112. The printed circuit board 136 inside the transmitter assembly 110 is thus permanently sealed and protected from the atmosphere surrounding the transmitter 100.

Transmitter 100 also includes a service block 114. Service block 114 includes terminals 116 that are adapted for electrical connection to field wiring 118. Field wiring 118 is typically a two wire 4–20 mA industrial control loop that energizes transmitter 100 and provides remote electrical transmission of a process fluid variable sensed by transmitter assembly 110. Screws 128 mount the service block 114 to the mounting ears 106. The service block also includes sealed programming jumper assemblies 120 and sealed programming pushbutton switches 130. The jumper assemblies 120 each include a removable jumper body 126 that can be inserted in one of several orientations for programming. Service block 114 also includes a sealed cable 122 that terminates in a sealed plug 124 that plugs into the transmitter electrical connector 112 and seals to the body of transmitter assembly 110. Service block 114 is described in more detail below in connection with FIGS. 4–12.

Figure 3:
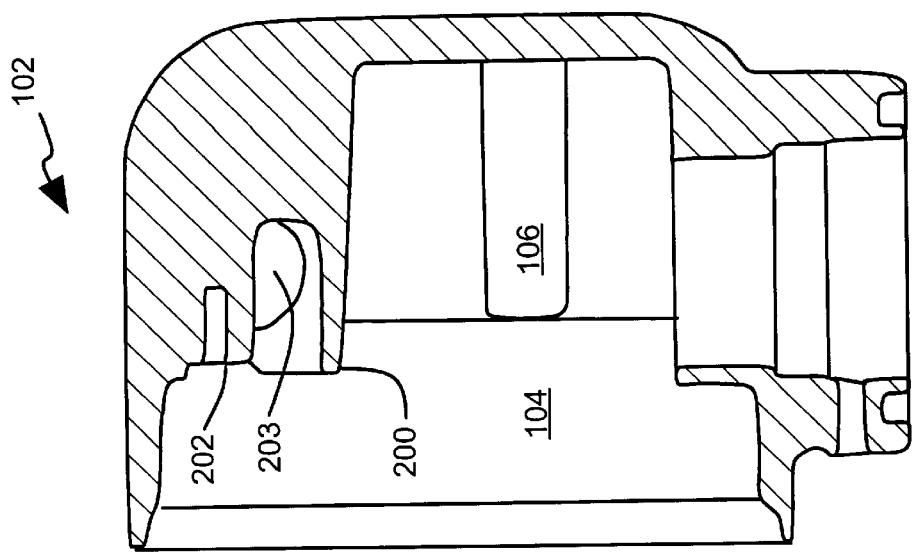
FIGS. 2–3 illustrate a field wiring housing.
Figure 2:
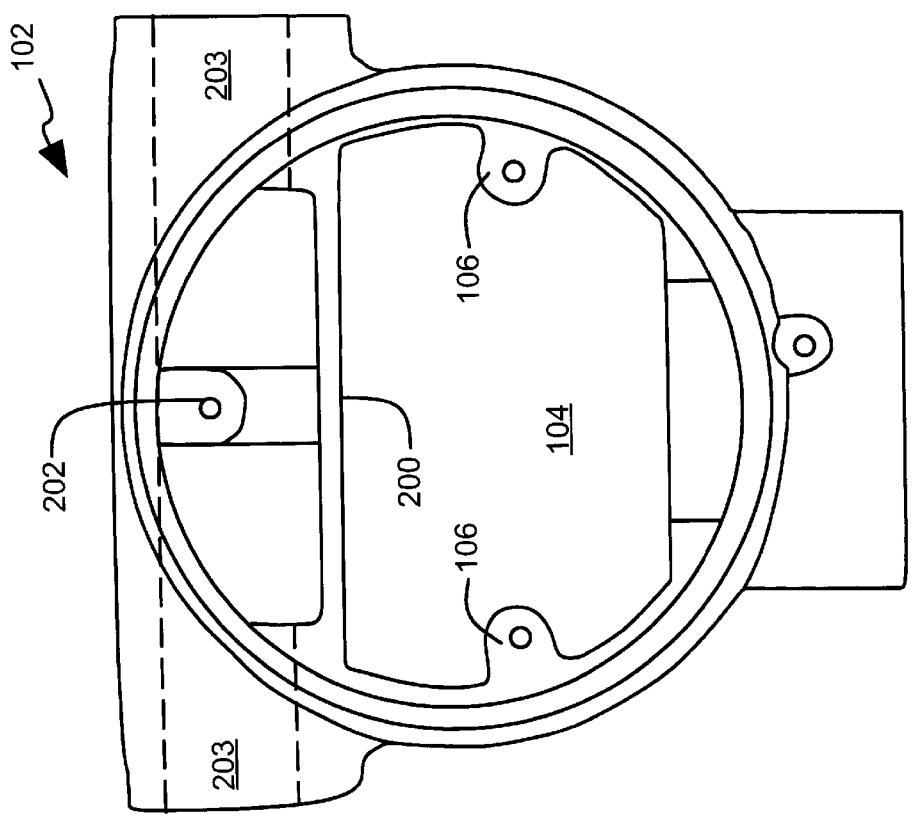

FIGS. 2–3 illustrate a field wiring housing 102. Field wiring housing 102 includes an internal wiring compartment 104. Mounting members 106 are disposed in the wiring compartment 104. In one embodiment, mounting ears 106 each have a threaded hole at the end and are generally cylindrical in shape and formed as part of the housing 102. While the ears 106 illustrated in FIGS. 2 and 3 are generally cylindrical, mounting members can take a variety of shapes such as bosses, tabs or other similar forms. The service block 114 mounts to the mounting ears 106 and also obtains an electrical ground connection from the mounting ears 106 as explained in more detail below in connection with FIGS. 11 and 12. A ledge 200 that is part of the field wiring housing 102 also provides a mounting surface for the service block 114. The field wiring housing 102 includes two threaded conduit entrances 203 that provide a passageway for field wiring into the wiring compartment 104. A threaded hole 202 is provided for an electrical ground connection for field wiring if needed. The field wiring housing 102 is formed of metal such as aluminum or stainless steel and electrically connects to the transmitter assembly 110 via threads for mechanical support and electrical grounding. The transmitter assembly 110 in turn electrically connects to ground at the process connection around isolators 132 as illustrated in FIG. 1.

Figure 4:
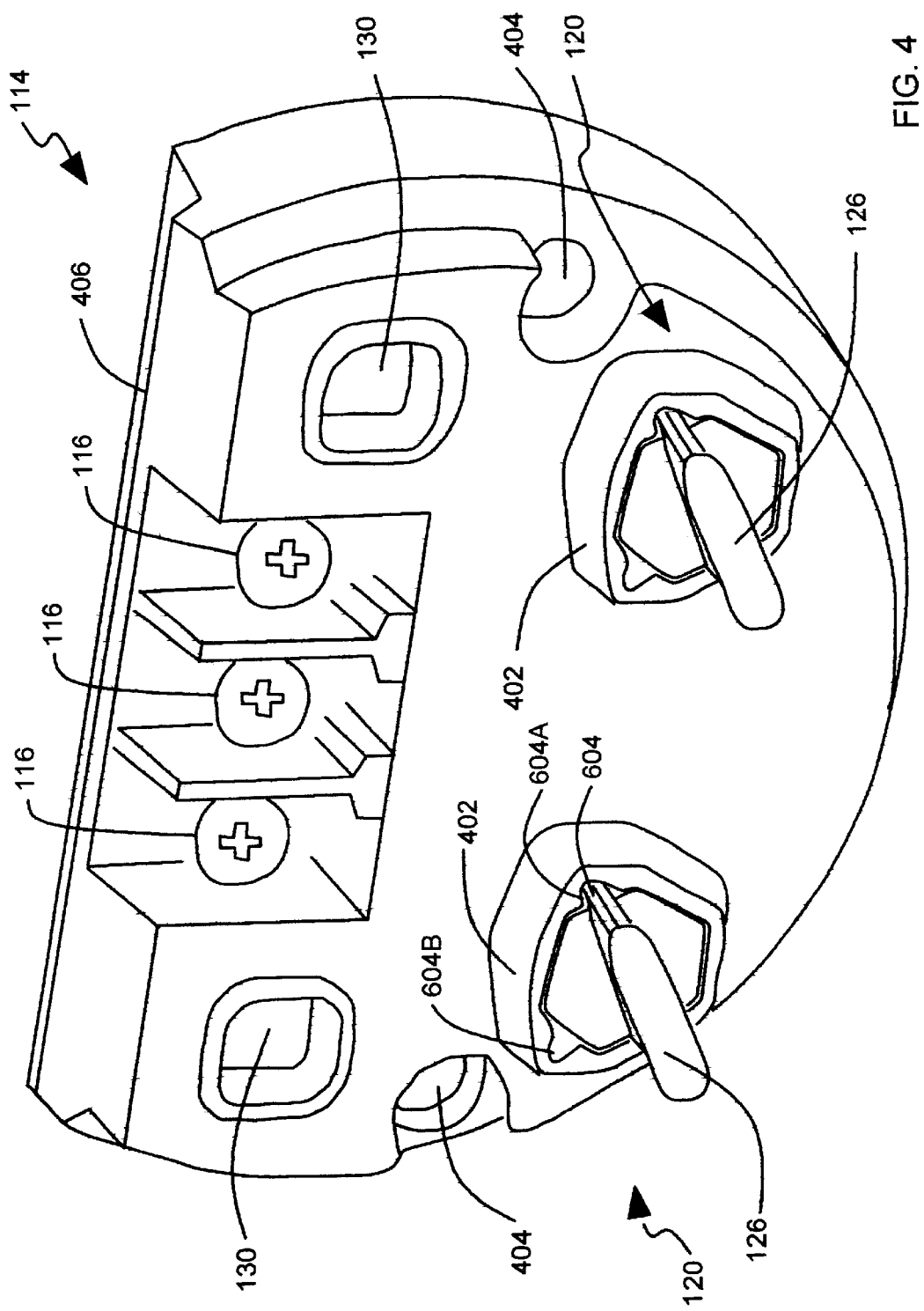
FIG. 4 illustrates an oblique front view of an environmentally sealed service block.

FIG. 4 illustrates an oblique front view of an environmentally sealed service block 114. Environmentally sealed service block 114 includes a set of terminals 116. Two of these terminals are connected to the field wiring 118 (illustrated in FIG. 1). The environmentally sealed service block 114 also includes two recessed push button switches 130 and two jumper assemblies 120. Each jumper assembly 120 includes a removable polygon shaped jumper body 126 that is keyed to engage a jumper cavity 402 in two selectable positions 604A, 604B. The jumper body 126 includes a metal jumper that contacts a different pair of electrical contacts in each selectable position 604A, 604B. Service block 114 includes holes 404 for receiving mounting screws 128 as illustrated in FIG. 1. Service block 114 also includes a ledge 406 which engages the corresponding ledge 200 of the field wiring housing 102, illustrated in FIGS. 2 and 3.

Figure 5:
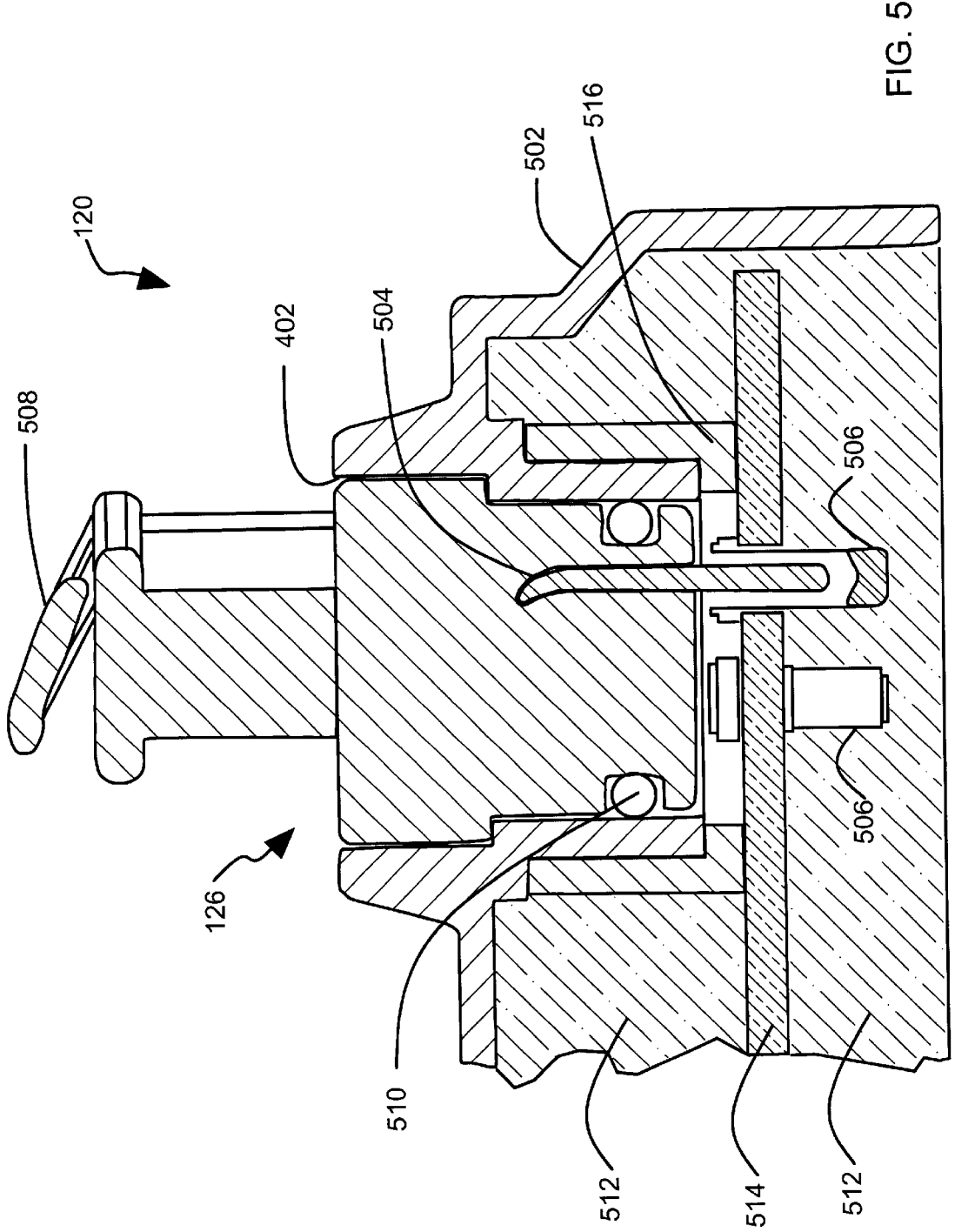
FIG. 5 illustrates a sealed programming jumper assembly.

FIG. 5 illustrates a sealed programming jumper assembly 120. Jumper assembly 120 has a generally polygon shaped jumper cavity 402 formed in an outer plastic shell 502. The outer plastic shell 502 is formed of a thermoplastic resin. The generally polygon shaped jumper cavity 402 receives a removable polygon shaped jumper body 126 that is keyed to engage the jumper cavity 402 in two selectable positions. The jumper body 126 has a metal jumper 504 that contacts a different pair of electrical contacts 506 in each selectable position. The jumper body 126 engages the jumper cavity 402 before the metal jumper 504 engages the electrical contacts 506 as the jumper body 126 is inserted in the jumper cavity 402. This arrangement prevents damage to the jumper contacts 506 due to misalignment.

The polygon shaped jumper body 126 and rim of the polygon shaped jumper cavity 402 provide visible indication of jumper assembly operation when the compartment cover 108 (FIG. 1) is removed. The jumper body 126 includes a retention spring 508 that is compressed by the compartment cover 108 (FIG. 1). This arrangement retains the jumper body 126 securely in the jumper cavity 402 when the transmitter 100 is subject to vibration in the field installation environment. An O-ring 510 around the jumper body 126 provides an environmental seal to prevent liquids and corrosive fluids from reaching the jumper 504 or the jumper contacts 506.

The service block 114 is filled with a potting compound 512 which prevents moisture and corrosive atmospheres from entering from the back side of the service block 114. A printed circuit board 514 is encapsulated in the potting compound 512. Jumper contacts 506 are deeply recessed behind the jumper cavity 402 to avoid contamination during the few seconds that a jumper body 126 is removed for programming. Resilient boot 516 prevents potting compound 512 from leaking into the jumper assembly 120 and also serves as an environmental seal. Jumper contacts 506 have a solid or blind bottom end to prevent potting compound 512 from leaking into the jumper contacts 506.

Figure 7:
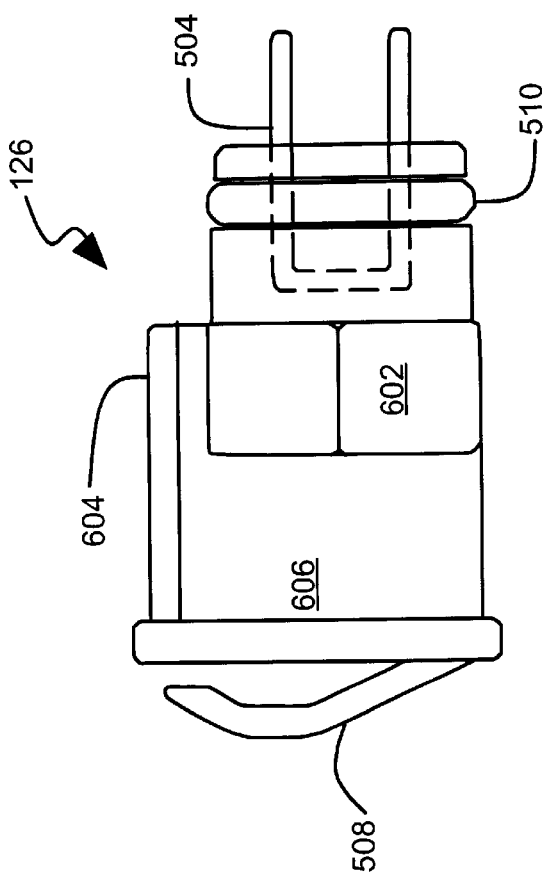
FIGS. 6–7 illustrate a removable polygon shaped jumper body.
Figure 6:
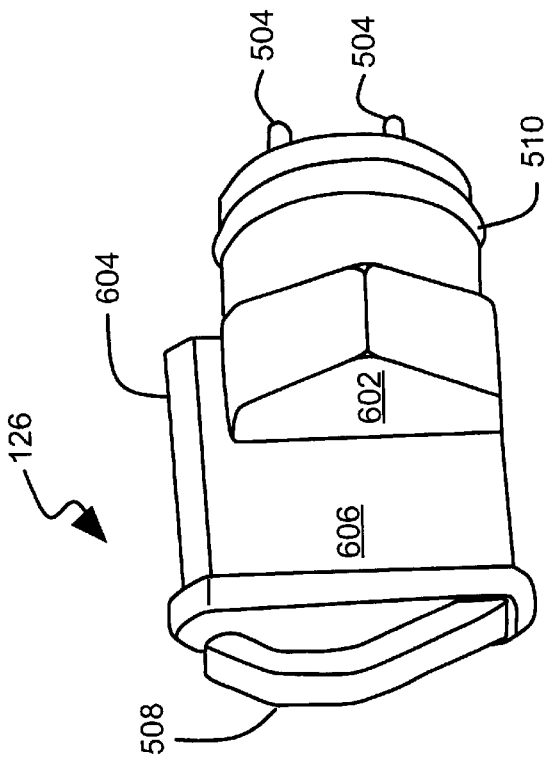

FIGS. 6–7 illustrate a removable polygon shaped jumper body 126 formed of plastic resin. Jumper body 126 includes an integrally molded spring 508 at one end and the metal jumper 504 at an opposite end. An O-ring 510 is retained in a groove on jumper body 126. The jumper body 126 also includes a generally hexagonal body element 602 and an indicator pointer 604 that engage the jumper cavity 402 illustrated in FIG. 5. The jumper body 126 also includes a handle 606 for manually removing and inserting the jumper body 126 into the jumper cavity 402.

Figure 8:
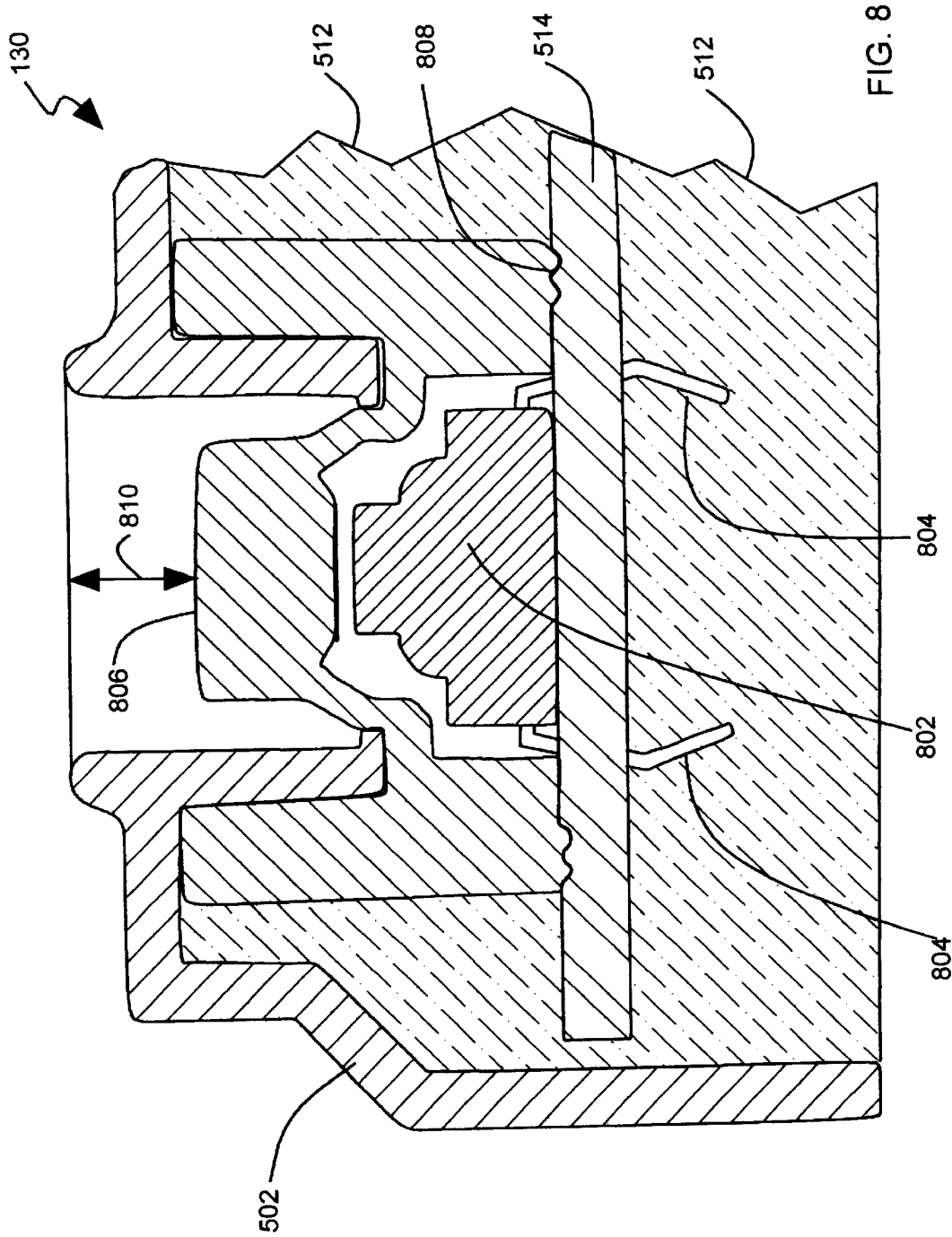
FIG. 8 illustrates a sealed programming pushbutton switch.

FIG. 8 illustrates a sealed programming pushbutton switch 130. The pushbutton switch 130 includes a commercially available switch 802 that can be actuated by pushing it. Switch 802 includes leads 804 that are soldered into circuit board 514. A resilient boot 806 surrounds the switch 802 to provide an environmental seal and a flexible, deflectable cover for switch actuation. Resilient boot 806 also serves to prevent potting compound 512 from entering the switch 802. The resilient boot 806 engages the outer plastic shell 502 to provide a seal. After the outer plastic shell 502, the circuit board 514, and the switch 802 have been assembled, then the potting compound 512 is poured into the outer plastic shell 502. The resilient boot 806 includes circular grooves 808 that also help to prevent the flow of potting compound into switch 802. The pushbutton switch 130 is environmentally sealed and can be actuated using a tool such as a pencil. The deflectable cover is recessed by an amount 810 to prevent inadvertent actuation by field wiring when the cover 108 (FIG. 1) is installed.

In one embodiment, the outer shell 502 is formed of Valox 310SEO and the resilient components 516, 806 are overmolded directly on the outer shell 502 from Monprene MP 1723 to provide environmental seals. In another embodiment, the outer shell 502 is formed of Noryl SE1X and the resilient components 516, 806 are overmolded directly on the outer shell 502 from Kraton G7705 to provide environmental seals. In another embodiment, the outer shell is formed of Valox 310 SEO and the resilient components 516, 806 are formed of Santoprene 8101-73 and simply assembled on the outer shell 502 to provide an environmental seal. Buna-N is a preferred material for O-rings.

Figure 9:
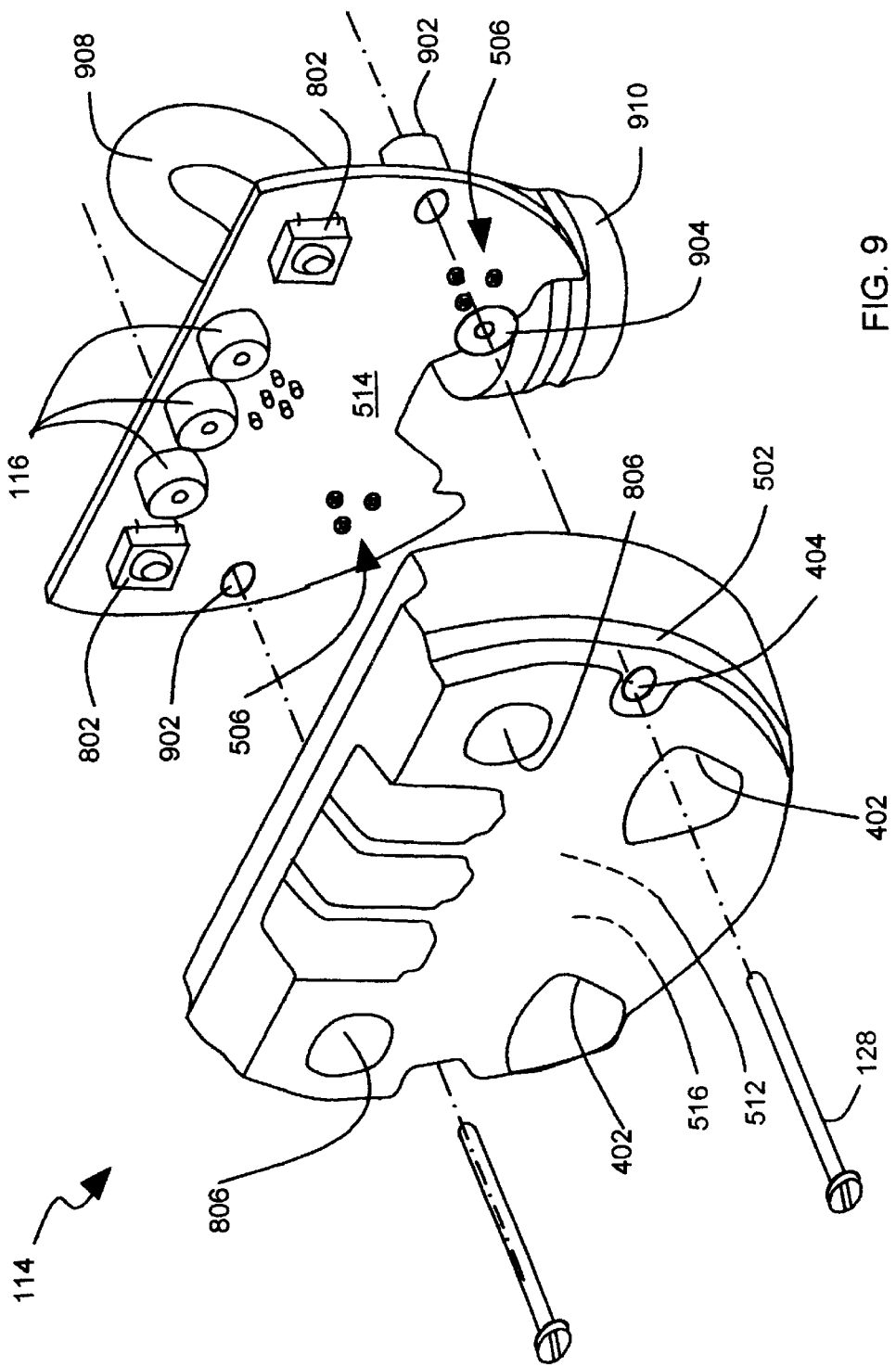
FIG. 9 illustrates a front exploded view of an environmentally sealed service block.

FIG. 9 illustrates a front exploded view of an environmentally sealed service block 114. Service block 114 includes an outer plastic shell 502, a circuit board assembly 514 and a sealed cord 908 connected to a plug 910. The circuit board has the switches 802, the terminals 116, the contacts 506 and other electronic components mounted on it. The circuit board also includes metal stand offs 902 that provide a ground connection to the housing 102 illustrated in FIGS. 2 and 3. Referring now to FIG. 1, the screws 128 pass through the holes 404 in the outer plastic shell 502 and also pass through the metal stand offs 902 and are threaded into the mounting ears 106 illustrated in FIGS. 2 and 3. The metal stand offs provide a ground connection between the circuit board assembly 514 and the field wiring housing 102. Sealing O-rings 904 are also included in the service block 114 to provide a seal that prevents potting compound from flowing out through holes 404. The outer plastic shell 502 includes the jumper cavities 402 and also has the resilient boots 806 mounted to it. The outer plastic shell 502 serves as a mold for potting compound 512, which effectively encapsulates and seals circuit board assembly 514.

Figure 10:
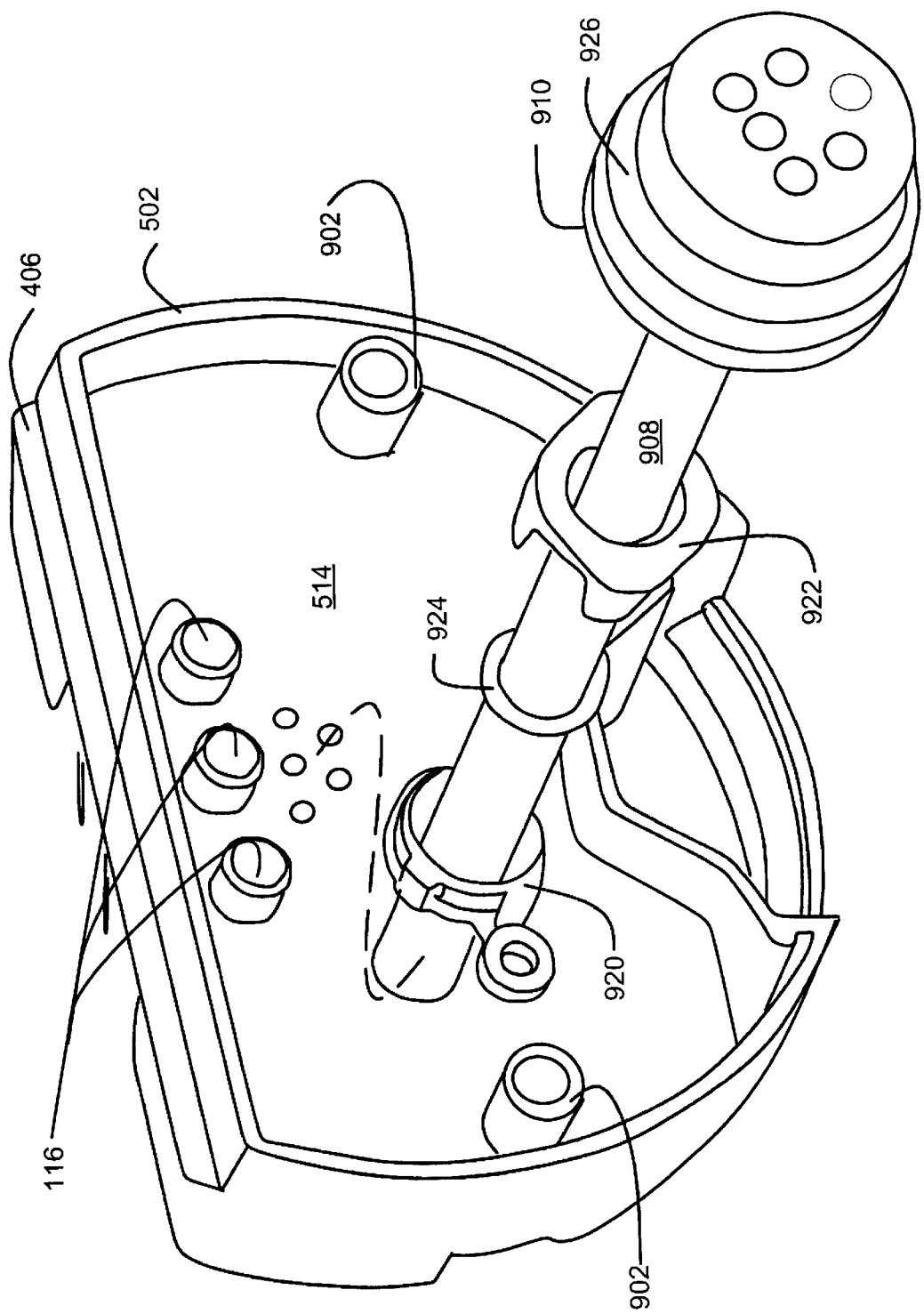
FIG. 10 illustrates a back exploded view of an environmentally sealed service block.

FIG. 10 illustrates a back exploded view of an environmentally sealed service block 114. The service block 114 includes an outer plastic shell 502 as illustrated which is open in the back to receive the circuit board assembly 514. The metal stand offs 902 protrude to the back edge of the outer plastic shell for making electrical contact with the housing. The terminals 116 are also visible from the back of the housing, but are later covered by potting compound. The sealed cord 908 is connected to the circuit board assembly 514. The sealed cord 908 has a set of plastic retainers 920, 922 that snap together around an O-ring 924 to form a sealed strain relief for the sealed cord 908. The plastic retainer 920 includes a screw mounting flange for securely fastening it to the circuit board assembly 514. After the sealed strain relief is in place, the potting compound is injected into the back of the service block 114 completing the assembly. The ends of the metal stand offs 902 are left exposed to provide electrical contact. The plug 910 includes an O-ring 926 to provide a seal to the sealed transmitter assembly 110 (FIG. 1).

Figure 11:
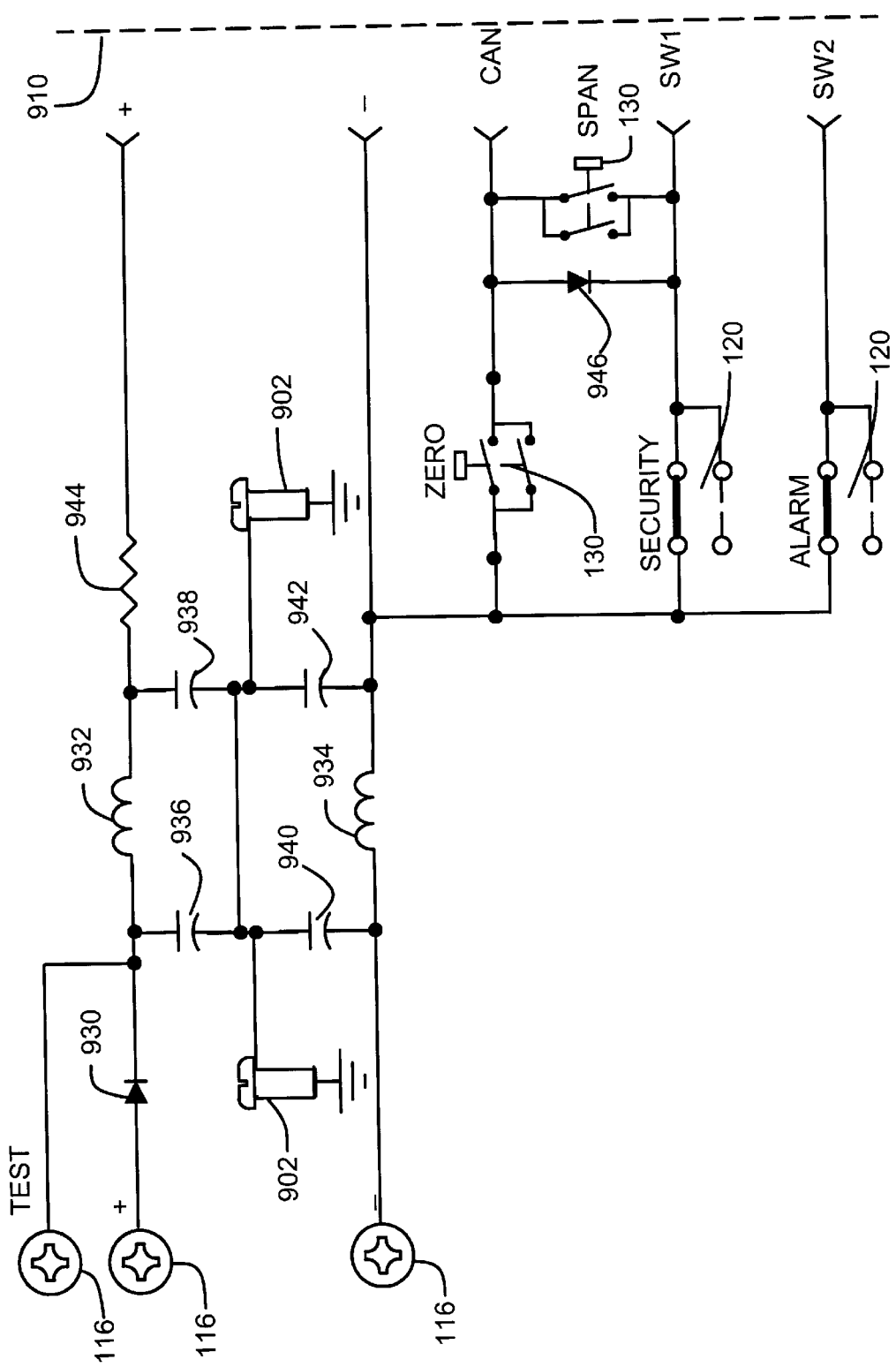
FIG. 11 illustrates an electrical schematic of an environmentally sealed service block that includes RFI suppression.

FIG. 11 illustrates an electrical schematic of an environmentally sealed service block 114 that includes RFI suppression. The electrical schematic illustrates the connection to terminals 116. The terminals 116 that are marked plus and minus are connectable to field wiring 118 as illustrated in FIG. 1. The remaining terminal 116 marked "test" is a low impedance test terminal and can be connected to a test instrument. A diode 930 provides the necessary voltage drop for the test. Typically, a low impedance meter instrument is connected between the "test" and "+" terminals 116. RFI filtering is provided for the sealed transmitter assembly 110 in the form of grounded pi LC filter sections. The pi LC filter section for the plus side of the field wiring comprises capacitors 936 and 938 and inductor 932. The pi LC filter section for the minus side of the field wiring includes capacitors 940, 942 and inductor 934. The pi section filters are grounded to the field wiring housing by way of the metal stand offs 902 as illustrated. A resistor 944 provides an additional voltage drop or current limiting in the connection between the field wiring and the sealed transmitter assembly 110. The current provided to the terminals 116 from the field wiring passes through the RFI filter to the plus and minus terminals of connector 910, which in turn connect to the sealed transmitter assembly 110. RFI noise is effectively filtered out of the current supplied to the sealed transmitter assembly 110. Programming switches 120 and 130 are also connected to the connector 910. These include a span pushbutton switch 130 and a zero pushbutton switch 130. The programming switches also include a security jumper 120 and an alarm jumper 120 as illustrated. A diode 946 is included in the service block 114 so that the sealed transmitter assembly 110 can electrically detect the presence of the service block 114 at power up.

Figure 12:
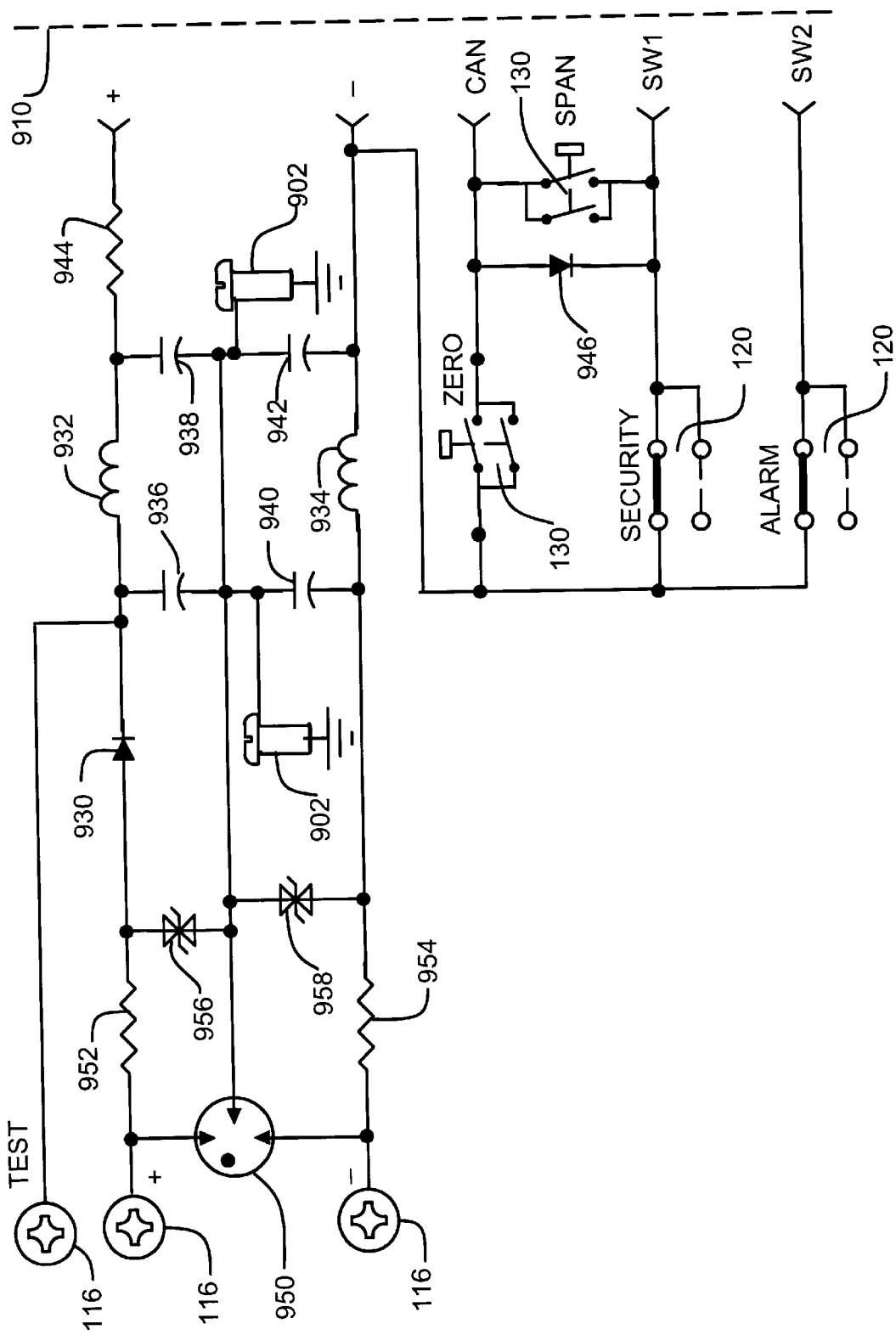
FIG. 12 illustrates an electrical schematic of an environmentally sealed service block that includes RFI and transient suppression.

FIG. 12 illustrates an electrical schematic of an environmentally sealed service block that includes RFI and transient suppression. FIG. 12 is similar to FIG. 11 in that it includes the RFI filters and zero span security and alarm switches. The circuit in FIG. 12 includes pi section RFI filters as explained in connection with FIG. 11. Additionally, the circuit in FIG. 12 includes a gas filled spark suppressor 950 connected between the field wiring terminals plus and minus 116 and the ground connection through metal stand offs 902. The circuit in FIG. 12 also includes isolation resistors 952, 954 and voltage limiting devices 956 and 958. In other respects, the circuit in FIG. 12 is similar to the circuit in FIG. 11.

The circuitry in FIGS. 11 or 12 is mounted on printed circuit assembly 514. Printed circuit assembly 514 includes a "ground plane" filling up unused areas of the circuit board and this ground plane is connected to ground by way of metal standoffs 902. The metal ledge 200 (FIGS. 2, 3) is also grounded and cooperates with the circuit board ground plane to form a Faraday cage around the electronic components illustrated in FIGS. 11–12 to provide further enhanced RFI shielding for the electronic components, cable 908 and plug 910. The ledge 200 shields the electronics and the sealed cable when cover 108 is removed, and the service block 114 includes a ground plane that also shields the electronics and the sealed cable 908 when cover 108 is removed. The ledge 200 and the ground plane cooperate to form a faraday cage type of shield.

Although the present invention has been described with reference to preferred embodiments, workers skilled in the art will recognize that changes may be made in form and detail without departing from the spirit and scope of the invention.

What is claimed is:

1. A process fluid transmitter, comprising:
   a field wiring housing having a removable compartment cover, a wiring compartment that is covered by the removable compartment cover, and the field wiring housing having at least one mounting member inside the wiring compartment and the field wiring housing having an opening adapted to receive a transmitter electrical connector;
   a permanently sealed transmitter assembly having a transmitter electrical connector disposed in the opening and accessible inside the wiring compartment; and
   a service block that is environmentally sealed and mounted to the mounting member, the service block including:
      terminals adapted for connection to field wiring;
      sealed programming jumper assemblies that are accessible upon removal of the removable compartment cover;
      sealed programming pushbutton switches that are accessible upon removal of the removable compartment cover; and
      a sealed cable connected to the terminals, the jumper assemblies, and the pushbutton switches and including a plug plugged into the transmitter electrical connector.

2. The process fluid transmitter of claim 1 wherein each jumper assembly includes:
   electrical contacts;
      a generally polygon-shaped jumper cavity formed in the service block around the electrical contacts; and
      a removable polygon-shaped jumper body keyed to insert into the generally polygon-shaped jumper cavity in a selected one of two selectable positions, the jumper body having a metal jumper that contacts a different pair of the electrical contacts in each selectable position.

3. The process fluid transmitter of claim 2 wherein the polygon-shaped jumper body engages the generally polygonal-shaped jumper cavity before the metal jumper engages the electrical contacts as the jumper body is inserted in the jumper cavity.

4. The process fluid transmitter of claim 2 wherein the polygon-shaped jumper body includes an indicator pointer and a rim of the polygon-shaped jumper cavity has first and second positions for the indicator pointer that provide a visible indication of jumper assembly operation when the compartment cover is removed.

5. The process fluid transmitter of claim 2 wherein the jumper body includes a retention spring that is compressed by the compartment cover.

6. The process fluid transmitter of claim 1 wherein each sealed jumper assembly comprises an O-ring seal.

7. The process fluid transmitter of claim 1 wherein the mounting member is formed as a mounting ear.

8. The process fluid transmitter of claim 1 wherein the service block includes screws that mount the service block to the mounting member.

9. The process fluid transmitter of claim 8 wherein the screws are removable from the mounting member by use of a screwdriver and the plug is manually unpluggable from the transmitter electrical connector such that the service block is field replaceable.

10. The process fluid transmitter of claim 1 wherein the service block includes electrical transient and RFI suppression components connected to the terminals.

11. The process fluid transmitter of claim 10 wherein one of the suppression components is grounded to the field wiring housing.

12. The process fluid transmitter of claim 2 wherein the transmitter assembly includes high impedance circuits connected to the electrical contacts.

13. The process fluid transmitter of claim 1 wherein the field wiring housing includes a ledge shielding the sealed cable when the compartment cover is removed, and the service block includes a ground plane shielding the sealed cable when the compartment cover is removed.

* * * * *

UNITED STATES PATENT AND TRADEMARK OFFICE
CERTIFICATE OF CORRECTION

PATENT NO. : 6,546,805 B2
DATED : April 15, 2003
INVENTOR(S) : Mark C. Fandrey et al.

It is certified that error appears in the above-identified patent and that said Letters Patent is hereby corrected as shown below:

<u>Title page,</u>
Item [56], References Cited,
U.S. PATENT DOCUMENTS, Insert:
-- 09/862,762   5/2001 Wang
   09/867,961   5/2001 Fandrey et al.
   09/671,495   9/2000 Behm et al.
   09/519,781   3/2000 Nelson et al.
   09/520,292   3/2000 Davis et al.
   09/519,912   3/2000 Nelson et al.
   09/672,338   9/2000 Nelson et al.
   09/638,181   7/2000 Roper et al.
   09/571,111   5/2000 Westfield et al.
   09/564,506   5/2000 Nord et al.
   09/667.289   9/2000 Westfield et al.
   09/667,399   9/2000 Behm et al.
   09/671,130   9/2000 Fandrey et al.
   29/120,531   3/2000 Fandrey et al.
   29/120,544   3/2000 Fandrey et al.
   29/120,538   3/2000 Fandrey et al.
   29/120,552   3/2000 Fandrey et al.
   29/120,537   3/2000 Fandrey et al.
   29/120,553   3/2000 Fandrey et al.
FOREIGN PATENT DOCUMENTS, Insert:
-- 0 167 941 A2        6/1985 EPO --.

UNITED STATES PATENT AND TRADEMARK OFFICE
CERTIFICATE OF CORRECTION

PATENT NO. : 6,546,805 B2
DATED : April 15, 2003
INVENTOR(S) : Mark C. Fandrey et al.

It is certified that error appears in the above-identified patent and that said Letters Patent is hereby corrected as shown below:

OTHER PUBLICATIONS, Insert:
-- International Search Report from the European Patent Office for International Application No. PCT/US01/14521 filed May 4, 2001. --

Signed and Sealed this

First Day of June, 2004

JON W. DUDAS
*Acting Director of the United States Patent and Trademark Office*